US012756006B2

(12) United States Patent
Lu et al.

(10) Patent No.: US 12,756,006 B2
(45) Date of Patent: Oct. 6, 2026

(54) FABRICATION PROCESS FOR POLYMER-BASED BIPOLAR BATTERIES VIA IN-SITU POLYMERIZATION

(71) Applicant: GM GLOBAL TECHNOLOGY OPERATIONS LLC, Detroit, MI (US)

(72) Inventors: Yong Lu, Shanghai (CN); Zhe Li, Shanghai (CN); Meiyuan Wu, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 758 days.

(21) Appl. No.: 17/884,410

(22) Filed: Aug. 9, 2022

(65) Prior Publication Data

US 2023/0344000 A1 Oct. 26, 2023

(30) Foreign Application Priority Data

Mar. 22, 2022 (CN) ......................... 202210284882.3

(51) Int. Cl.
*H01M 10/0565* (2010.01)
*C08G 59/50* (2006.01)
(Continued)

(52) U.S. Cl.
CPC ........ *H01M 10/0565* (2013.01); *C08G 59/50* (2013.01); *C08K 3/22* (2013.01);
(Continued)

(58) Field of Classification Search
CPC ......... H01M 10/0565; H01M 10/0525; H01M 10/282; H01M 10/0418; H01M 10/0585;
(Continued)

(56) References Cited

U.S. PATENT DOCUMENTS 8,535,834 B1 * 9/2013 Yoon ...................... H01G 11/62
429/322
10,319,978 B2 6/2019 Zeng et al.
(Continued)

FOREIGN PATENT DOCUMENTS

CN 102382551 A * 3/2012
CN 103066325 A * 4/2013
(Continued)

OTHER PUBLICATIONS

CN_102382551_A Translation (Year: 2012).*
(Continued)

*Primary Examiner* — Carlos Barcena
(74) *Attorney, Agent, or Firm* — Harness, Dickey & Pierce, P.L.C.

(57) ABSTRACT

Methods of forming a battery via in situ polymerization are provided. A precursor of a first blocker composition is applied to select edge regions of at least one bipolar electrode and terminal negative and positive electrodes. The components are assembled to form a stack with at least two insulating interlayers disposed between electrodes of opposite polarities. The precursor is reacted to form a first blocker composition sealing three sides of the stack to define a fillable interior region. Next, a polymer electrolyte precursor is injected into the fillable interior region. A precursor of a second blocker composition is applied to a terminal region of the fourth side of the stack. The precursors are concurrently reacted to form a polymer electrolyte and a second blocker composition along the fourth side. The first and second blocker compositions define a sealed pouch including the stack comprising the polymer electrolyte.

20 Claims, 3 Drawing Sheets

(51) Int. Cl.
*C08K 3/22* (2006.01)
*C08K 3/36* (2006.01)
*H01M 10/0525* (2010.01)
*H01M 10/28* (2006.01)

(52) U.S. Cl.
CPC ........... *C08K 3/36* (2013.01); *H01M 10/0525* (2013.01); *H01M 10/282* (2013.01); *C08K 2003/2227* (2013.01); *C08K 2003/2241* (2013.01); *C08K 2003/2244* (2013.01); *H01M 2300/0028* (2013.01); *H01M 2300/0082* (2013.01); *H01M 2300/0085* (2013.01)

(58) Field of Classification Search
CPC . H01M 2300/0028; H01M 2300/0082; H01M 2300/0085; H01M 50/183; C08G 59/50; C08K 3/22; C08K 3/36; C08K 2003/2227; C08K 2003/2241; C08K 2003/2244; Y02E 60/10; Y02P 70/50
See application file for complete search history.

(56) References Cited

U.S. PATENT DOCUMENTS

| | | | | |
|---|---|---|---|---|
| 10,658,663 | B2 | 5/2020 | Zhang et al. | |
| 10,714,756 | B2 | 7/2020 | Dai et al. | |
| 10,944,100 | B2 | 3/2021 | Liu et al. | |
| 11,121,375 | B2 | 9/2021 | Hou et al. | |
| 11,145,922 | B2 | 10/2021 | Li et al. | |
| 11,205,798 | B2 | 12/2021 | Li et al. | |
| 11,217,826 | B2 | 1/2022 | Li et al. | |
| 11,295,901 | B2 | 4/2022 | Hou et al. | |
| 11,358,647 | B1 | 6/2022 | Newcomb et al. | |
| 11,383,771 | B1 | 7/2022 | Newcomb et al. | |
| 11,404,714 | B2 | 8/2022 | Hou et al. | |
| 11,735,768 | B2 | 8/2023 | Frieberg | |
| 11,967,722 | B2 | 4/2024 | Su et al. | |
| 2003/0017344 | A1* | 1/2003 | Remmert | B05D 7/586 427/534 |
| 2003/0049541 | A1* | 3/2003 | Inagaki | H01M 4/5815 429/223 |
| 2007/0042266 | A1* | 2/2007 | Oh | H01G 11/56 429/188 |
| 2013/0224609 | A1* | 8/2013 | Lee | H01M 12/08 429/492 |
| 2016/0104918 | A1* | 4/2016 | Wang | H01B 1/122 429/189 |
| 2017/0331092 | A1* | 11/2017 | Chen | H01M 4/382 |
| 2020/0403267 | A1 | 12/2020 | Li et al. | |
| 2021/0020929 | A1 | 1/2021 | Kong et al. | |
| 2021/0036310 | A1 | 2/2021 | Hou et al. | |
| 2021/0036360 | A1 | 2/2021 | Li et al. | |
| 2021/0050596 | A1 | 2/2021 | Li et al. | |
| 2021/0057776 | A1 | 2/2021 | Lu et al. | |
| 2021/0066746 | A1 | 3/2021 | Hou et al. | |
| 2021/0111426 | A1 | 4/2021 | Li et al. | |
| 2021/0135224 | A1 | 5/2021 | Hou et al. | |
| 2022/0102756 | A1 | 3/2022 | Frieberg et al. | |
| 2022/0123352 | A1 | 4/2022 | Li et al. | |
| 2022/0140422 | A1 | 5/2022 | Chen et al. | |
| 2022/0166031 | A1 | 5/2022 | Li et al. | |
| 2022/0181598 | A1 | 6/2022 | Lu et al. | |
| 2022/0181685 | A1 | 6/2022 | Li et al. | |
| 2022/0212449 | A1 | 7/2022 | Newcomb et al. | |
| 2022/0227425 | A1 | 7/2022 | Newcomb et al. | |
| 2022/0263055 | A1 | 8/2022 | Hou et al. | |
| 2022/0263129 | A1 | 8/2022 | Lu et al. | |
| 2022/0302526 | A1 | 9/2022 | Li et al. | |
| 2022/0407079 | A1 | 12/2022 | Lu et al. | |
| 2023/0015143 | A1 | 1/2023 | Su et al. | |
| 2023/0024667 | A1 | 1/2023 | Li et al. | |
| 2023/0025830 | A1 | 1/2023 | Su et al. | |
| 2023/0128413 | A1 | 4/2023 | Frieberg et al. | |
| 2023/0246310 | A1 | 8/2023 | Lu et al. | |

FOREIGN PATENT DOCUMENTS

| | | | | |
|---|---|---|---|---|
| CN | 113903976 | A | | 1/2022 |
| CN | 116826158 | A | | 9/2023 |
| DE | 102022118604 | A1 | | 9/2023 |
| JP | 2012234823 | A | | 11/2012 |
| KR | 20030075985 | A | | 9/2003 |
| TW | 202135364 | A | * | 9/2021 |

OTHER PUBLICATIONS

CN_110140252_A Original file and translation (Year: 2019).*
CN-103066325-A Translation (Year: 2013).*
TW_202135364_A Translation with numbered paragraphs (Year: 2021).*
JP_WO2015068548_A1 Translation and Original File (Year: 2015).*
Yoshima et al, "Thin hybrid electrolyte based on garnet-type lithium-ion conductor Li7La3Zr2O12 for 12 V-class bipolar batteries"; Journal of Power Sources 302 (2016) 283e290; journal homepage: www.elsevier.com/lo cate/ipowsou.
Chen et al; Abstract of "Ionogel Electrolytes for High-Performance Lithium Batteries: A Review"; Advanced Energy Materials; vol. 8, Issue 12; Jan. 31, 2018; https://onlinelibrary.wiley.com/doi/abs/10.1002/aenm.201702675.
Susan et al; Abstract of "Ion Gels Prepared by in Situ Radical Polymerization of Vinyl Monomers in an Ionic Liquid and Their Characterization as Polymer Electrolytes"; Journal of the American Chemical Society 127 (13):4976-83; May 2005; https://www.researchgate.net/publication/7938588.
Bradley R. Frieberg; U.S. Appl. No. 17/171,489, filed Feb. 9, 2021; entitled "Gel Electrolyte for Solid-State Battery"; 68 pages.
Mengyan Hou et al.; U.S. Appl. No. 17/550,507, filed Dec. 14, 2021; entitled "Bipolar Solid-State Battery with Enhanced Interfacial Contact"; 65 pages.
Bradley R. Frieberg et al.; U.S. Appl. No. 17/551,753, filed Dec. 15, 2021; entitled "Solid Electrolyte Coating of Lithium-Doped Silicon Oxide Particles as Anode Active Material"; 39 pages.
Yong Lu et al.; U.S. Appl. No. 17/556,175, filed Dec. 20, 2021; entitled "Non-Flammable Solvate Ionic Liquid Electrolyte with Diluters"; 59 pages.
Qili Su et al.; U.S. Appl. No. 17/560,673, filed Dec. 23, 2021; entitled "Folded Bipolar Battery Design"; 45 pages.
Zhe Li et al.; U.S. Appl. No. 17/683,976, filed Mar. 1, 2022; entitled "Self-Heating Bipolar Solid-State Battery"; 72 pages.
Qili Su et al.; U.S. Appl. No. 17/688,445, filed Mar. 7, 2022; entitled "Methods of Fabricating Bipolar Solid State Batteries"; 77 pages.
Yong Lu et al.; U.S. Appl. No. 17/696,567, filed Mar. 16, 2022; entitled "Designs of High-Power Gel-Assisted Bipolar Solid-State Battery"; 64 pages.
Qili Su et al.; U.S. Appl. No. 17/697,135, filed Mar. 17, 2022; entitled "Methods of Manufacturing Bipolar Solid-State Batteries"; 77 pages.
Qi Lu et al.; U.S. Appl. No. 17/698,865, filed Mar. 18, 2022; entitled "Bipolar Current Collector and Method of Making the Same"; 48 pages.
Zhe Li et al.; U.S. Appl. No. 17/707,524, filed Mar. 29, 2022; entitled "Argyrodite Solid Electrolytes for Solid-State Batteries and Methods of Making the Same"; 56 pages.
First Office Action for Chinese Patent Application No. 202210284882.3 issued Aug. 1, 2026, with correspondence from China Patent Agent (H.K.) Ltd summarizing Office Action; 21 pages.

* cited by examiner

FABRICATION PROCESS FOR POLYMER-BASED BIPOLAR BATTERIES VIA IN-SITU POLYMERIZATION

CROSS-REFERENCE TO RELATED APPLICATIONS

This application claims the benefit and priority of Chinese Application No. 202210284882.3 filed Mar. 22, 2022. The entire disclosure of the above application is incorporated herein by reference.

INTRODUCTION

This section provides background information related to the present disclosure which is not necessarily prior art.

The present disclosure pertains to methods for fabricating polymer gel-based bipolar batteries, such as lithium-ion batteries via a streamlined in-situ polymerization process.

High-energy density, electrochemical cells, such as lithium-ion batteries can be used in a variety of consumer products and vehicles, such as start-stop systems (e.g., 12V start-stop systems), battery-assisted systems ("μBAS"), Hybrid Electric Vehicles ("HEVs"), and Electric Vehicles ("EVs"). Typical lithium-ion batteries include cells each having a first electrode (e.g., a positive electrode or cathode) and a second electrode (e.g., a negative electrode or anode) a liquid electrolyte material and a microporous polymeric separator. The lithium-ion cells operate by reversibly passing lithium ions between the negative electrode and the positive electrode. Multiple lithium-ion battery cells may be electrically connected to increase overall output in a battery.

Semi-solid and solid-state batteries replace the liquid electrolyte (and often the microporous polymeric separator in which the liquid electrolyte is distributed) with a semi-solid or solid-state electrolyte interlayer. Such semi-solid and solid-state batteries have advantages over batteries that include a liquid electrolyte, including a longer shelf life with lower self-discharge, simpler thermal management, a reduced need for packaging, and the ability to operate within a wider temperature window. For example, semi-solid electrolytes and/or solid-state electrolytes are generally non-volatile and non-flammable, so as to allow cells to be cycled under harsher conditions without experiencing diminished potential or thermal runaway, which can potentially occur with the use of liquid electrolytes.

A single cell may thus be assembled in a laminated cell structure, comprising an anode layer, a cathode layer, and electrolyte/separator between the anode and cathode layers. Generally, an electrochemical cell can refer to a unit that can be connected to other units. For certain designs, positive electrode and negative electrode can be stacked with the separator between them and the resulting stack structure placed in a pouch. Traditionally, cell sealing generally includes sealing with a machine/crimper, aligning the cap with the open end of the case or pouch, and sealing the case or pouch. Electrolyte is added to the case or pouch, which is then sealed to complete the battery. Electrolyte filling generally includes injecting the case or pouch with a liquid electrolyte.

In certain other aspects, where the cell is a semi-solid or solid-state battery, in-situ methods of forming a polymer gel electrolyte may include introducing a polymer gel electrolyte into each of the plurality of electrochemical cells. However, these methods require many processing steps, including various spraying and scrubbing steps, as well as suffering from potential loss of solvent via evaporation during the process. Thus, it would be desirable to provide methods of fabrication of high-power gel electrolyte-assisted solid-state batteries having fewer steps and reduced inadvertent loss of solvent via solvent evaporation.

SUMMARY

This section provides a general summary of the disclosure and is not a comprehensive disclosure of its full scope or all of its features.

The present disclosure relates to a method of forming a battery via in situ polymerization. The method optionally includes applying a first blocker composition precursor to select edge regions of at least one bipolar electrode, a terminal negative electrode, and a terminal positive electrode. The method includes assembling the at least one bipolar electrode, the terminal negative electrode, and the terminal positive electrode with at least two insulating interlayers disposed between electrodes of opposite polarities to form a stack defining a first side, a second side, a third side, and a fourth side. The first blocker composition precursor reacts to form a first blocker composition sealing the first side, the second side, and the third side that together define a fillable interior region. The method further includes injecting a precursor of a polymer electrolyte into the fillable interior region and applying a second blocker composition precursor to a terminal region of the fourth side. The method also includes concurrently reacting the precursor of the polymer electrolyte and the precursor of the second blocker composition to form a polymer electrolyte within the stack and a second blocker composition along the fourth side. The first blocker composition and the second blocker composition define a sealed pouch including the stack including the polymer electrolyte.

In one aspect, the concurrently reacting the precursor of the polymer electrolyte and the precursor of the second blocker composition occurs at greater than or equal to about 80° C. to less than or equal to about 90° C. for greater than or equal to about 30 minutes to less than or equal to about 3 hours.

In one aspect, the first blocker composition and the second blocker composition each have a thickness independently selected from greater than or equal to about 2 micrometers to less than or equal to about 200 micrometers.

In one aspect, the first blocker composition and the second blocker composition each includes greater than or equal to about 70 weight % of an epoxy resin, less than or equal to about 10 weight % of a curing agent, and greater than or equal to about 20 weight % of an inorganic filler.

In one further aspect, the epoxy resin includes a bisphenol A diglycidyl ether, a curing agent includes a polyether amine-based compound, and the inorganic filler is selected from the group consisting of silicon dioxide ($SiO_2$), aluminum oxide ($Al_2O_3$), zirconium oxide ($ZrO_2$), aluminum oxide hydroxide (γ-AlOOH), titanium dioxide ($TiO_2$), and combinations thereof.

In one aspect, the polymer gel electrolyte includes a polymeric host, at least one lithium salt, and at least one solvent.

In one aspect, the polymer gel electrolyte has greater than 0 weight % to less than or equal to about 20 weight % of the polymeric host, greater than or equal to about 10 weight % to less than or equal to about 20 weight % of the at least one lithium salt, and greater than or equal to about 80 weight % to less than or equal to about 99 weight % of the at least one solvent.

In one aspect, the polymeric host is selected from the group consisting of polyvinylidene fluoride (PVdF), polyvinylidene fluoride copolymers (e.g., PVdF-hexafluoropropylene or (PVdF-HFP)), polyacrylonitrile (PAN), polymethylmethacrylate (PMMA), oligomers, copolymers, and combinations thereof.

In one aspect, the at least one lithium salt is selected from the group consisting of lithium bis(trifluoromethanesulfonyl)imide (LiTFSI), lithium bis(fluorosulfonyl)imide (LiFSI), hexafluoroarsenate, bis(trifluoromethanesulfonyl) imide (TFSI), bis(pentafluoroethanesulfonyl)imide (BETI), lithium hexafluoroarsenate ($LiAsF_6$), lithium hexafluorophosphate ($LiPF_6$), lithium bis(pentafluoroethanesulfonyl) imide (LiBETI), lithium bis(oxalato)borate (LiBOB), lithium difluoro(oxalato)borate (LiDFOB), lithium tetrafluoroborate ($LiBF_4$), lithium perchlorate ($LiClO_4$), lithium trifluoromethyl sulfonate (LiTFO), lithium-cyclo-difluoromethane-1,1-bis(sulfonyl)imide (LiDMSI), lithium bis(monofluoromalonato)borate (LiBFMB), lithium difluorophosphate ($LiPO_2F_2$), lithium fluoride (LiF), lithium difluoro(oxalato)borate (LiDFOB), and combinations thereof.

In one aspect, the at least one solvent is selected from the group consisting of: ethylene carbonate (EC), diethylene carbonate (DEC), ethylmethylene carbonate (EMC), vinyl ethylene carbonate (VEC), dimethylene carbonate (DMC), vinylene carbonate (VC), and polystyrene (PS), and combinations thereof. In one variation, the solvents include ethylene carbonate (EC), diethylene carbonate (DEC), ethylmethylene carbonate (EMC), vinyl ethylene carbonate (VEC), dimethylene carbonate (DMC), vinylene carbonate (VC), polystyrene (PS), and combinations thereof.

In one aspect, the at least one bipolar electrode includes a plurality of bipolar electrodes and the applying the first blocker composition precursor is to select edge regions of each of the plurality of bipolar electrodes.

The present disclosure also further relates to a method of forming a battery via in situ polymerization. The method may include applying a first epoxy-based blocker composition precursor to select edge regions of at least one bipolar electrode, a terminal negative electrode, and a terminal positive electrode. The method also includes assembling the at least one bipolar electrode, the terminal negative electrode, and the terminal positive electrode with at least two insulating interlayers disposed between electrodes of opposite polarities to form a stack defining a first side, a second side, a third side, and a fourth side. The first epoxy-based blocker composition precursor is reacted to form a first epoxy-based blocker composition sealing the first side, the second side, and the third side that together define a fillable interior region. The method includes injecting a precursor of a polymer electrolyte into the fillable interior region and applying a second epoxy-based blocker composition precursor to a terminal region of the fourth side. The method also includes concurrently reacting the precursor of the polymer electrolyte and the precursor of the second epoxy-based blocker composition to form a polymer electrolyte within the stack and a second epoxy-based blocker composition along the fourth side. The polymer gel electrolyte thus formed includes a polymeric host including a polyalkylene oxide, bis(trifluoromethanesulfonyl)imide (LiTFSI) and lithium tetrafluoroborate ($LiBF_4$), and a solvent mixture including ethylene carbonate (EC), diethylene carbonate (DEC), and ethylmethylene carbonate (EMC). The first epoxy-based blocker composition and the second epoxy-based blocker composition define a sealed pouch including the stack including the polymer electrolyte.

In one aspect, the polyalkylene oxide includes polyethylene oxide (PEO).

In one aspect, the electrolyte includes about 0.5 M of bis(trifluoromethanesulfonyl)imide (LiTFSI) and about 0.5 M of lithium tetrafluoroborate ($LiBF_4$).

In one aspect, a volume ratio of ethylene carbonate (EC) to diethylene carbonate (DEC) to and ethylmethylene carbonate (EMC) in the solvent mixture is about 1:1:1.

In one aspect, the polymer gel electrolyte includes greater than or equal to about 82 weight % to less than or equal to about 90 weight % of the solvent mixture, and the polymer gel electrolyte further includes vinylene carbonate (VC) at about 1 weight % of the total weight of the polymer gel electrolyte, vinyl ethylene carbonate (VEC) at about 0.5 weight % of the total weight of the polymer gel electrolyte, and polystyrene at about 1.5 weight % of the total weight of the polymer gel electrolyte.

In one aspect, the first blocker composition and the second blocker composition each have a thickness independently selected from greater than or equal to about 2 micrometers to less than or equal to about 200 micrometers.

In one aspect, the first epoxy-based blocker composition and the second first epoxy-based blocker composition each includes greater than or equal to about 70 weight % of an epoxy resin, less than or equal to about 10 weight % of a curing agent, and greater than or equal to about 20 weight % of an inorganic filler.

In one aspect, the epoxy resin includes a bisphenol A diglycidyl ether, a curing agent includes a polyether amine-based compound, and the inorganic filler is selected from the group consisting of: silicon dioxide ($SiO_2$), aluminum oxide ($Al_2O_3$), zirconium oxide ($ZrO_2$), aluminum oxide hydroxide (γ-AlOOH), titanium dioxide ($TiO_2$), and combinations thereof.

In one aspect, the polyalkylene oxide is greater than 0 weight % to less than or equal to about 20 weight % of a total weight of the polymer gel electrolyte, a total amount of the bis(trifluoromethanesulfonyl)imide (LiTFSI) and lithium tetrafluoroborate ($LiBF_4$) is greater than or equal to about 10 weight % to less than or equal to about 20 weight % of the polymer gel electrolyte, and greater than or equal to about 80 weight % to less than or equal to about 99 weight % of the at least one solvent.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
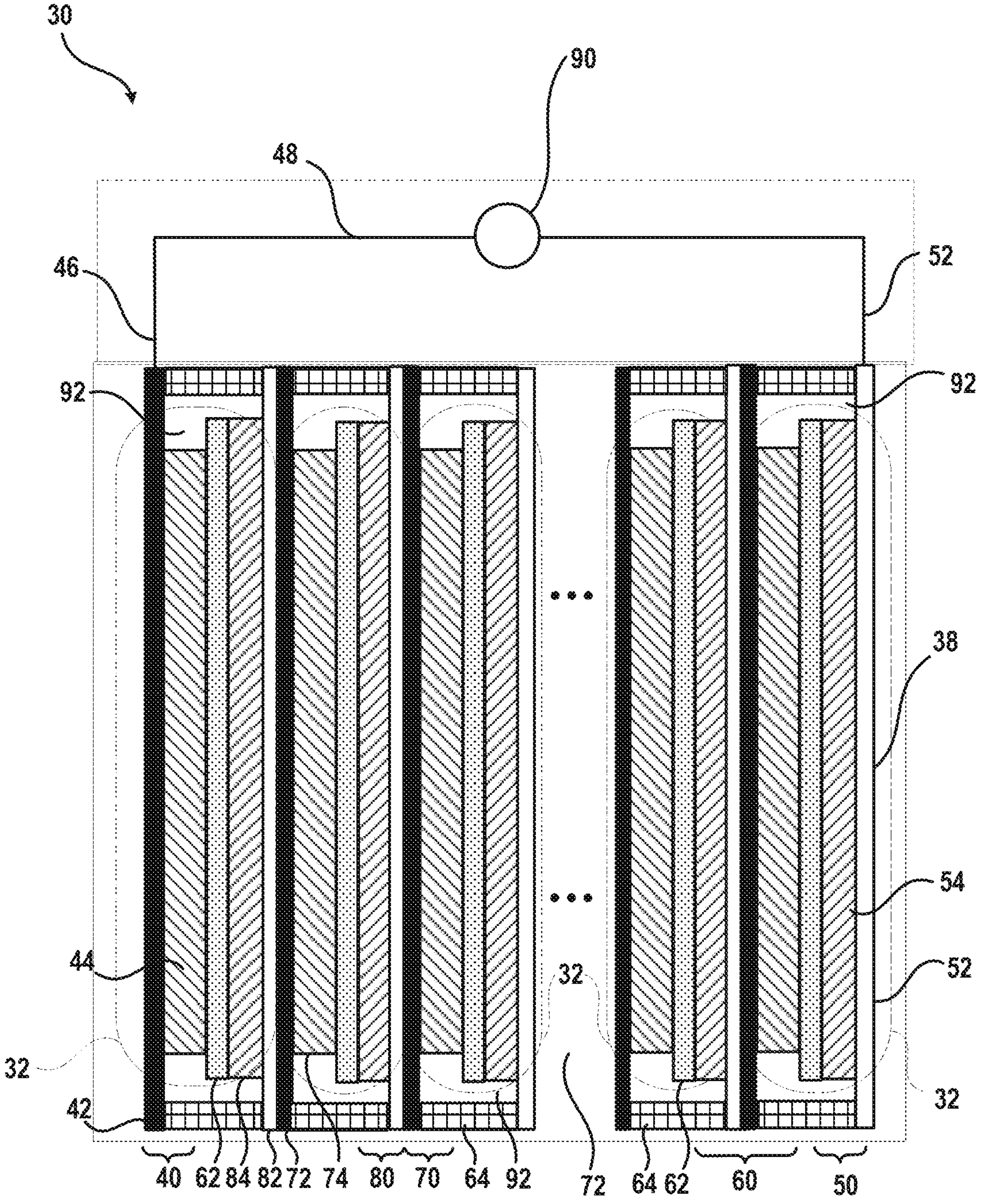
FIG. 1 is a schematic illustration of a simplified example of a cross-section of a battery for cycling lithium ions including a bipolar electrodes.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Gel-based bipolar batteries with high-power capability can improve an energy density of a battery pack by saving connecting tabs and battery packages. However, currently it is a relative complicated process to fabricate gel-based bipolar cells, which need specialized fabrication equipment and multiple processing steps. The present disclosure provides a streamlined process for producing gel-based bipolar batteries by selecting temperature compatible gel precursor solutions and blockers for one-step solidification, which help to make full use of traditional fabrication lines.

In various aspects, the present disclosure contemplates a simplified process for fabrication of polymerization-based lithium ion cells. For example, the methods may provide a single step in-situ polymerization/gelation and sealing by selecting compatible precursors of a polymer gel electrolyte and blocker composition that concurrently form polymer gel electrolyte and a sealed interior of a cell. Further, as will be described herein, the present disclosure provides methods that form a specialized "pouch" prior to injecting the polymer gel electrolyte precursor and blocker compositions. In this manner, the methods of various aspects of the present disclosure provide scalable and simplified fabrication processes, particularly useful in forming gel-based bipolar cells having polymer gel electrolyte, including semi-solid and solid-state cells.

As will be described herein, in lithium-ion batteries incorporating a bipolar component may be readily sealed at terminal edges by a polymeric/composite sealant. The bipolar components typically have a current collector or two current collectors adjacent to and in contact with one another. One side of the current collector has a positive electrode, while the other opposite side of the current collector has a negative electrode. Multiple bipolar components may be stacked within a cell and disposed between a terminal positive electrode and a terminal negative electrode. In the design incorporating bipolar components, tabs to an external circuit only extend from the terminal positive electrode and the terminal negative electrode. Thus, the terminal edges of the bipolar components may be easily sealed with a blocker or sealant material, because no external connection is required. As will be described further herein, cells with these designs are particularly well suited for forming an interim "pouch" that can receive an injected polymer gel electrolyte precursor, which infuses into pores of the respective components and forms the polymer gel electrolyte.

By way of background, semi-solid and solid-state batteries (SSBs) that cycle lithium ions, for example, bipolar solid-state batteries may include at least one component having a solid state, for example, at least one solid electrode, but may also include semi-solid or gel, liquid, or gas components, in certain variations. In certain variations, the components in the solid-state battery may exclude liquids and only include components having a semi-solid (or gel) or solid state.

Typical batteries comprise at least one positive electrode or cathode, at least one negative electrode or anode, an electrolyte material, and optionally, a separator. A stack of lithium-ion battery cells may be electrically connected in an electrochemical device to increase overall output (for example, typically they are connected in parallel to increase current output). Solid-state batteries may have a bipolar stack design comprising a plurality of bipolar electrodes. As noted above, bipolar electrodes may be an assembled component that has both a positive polarity side and a negative polarity side. More specifically, a bipolar electrode includes a bipolar current collector that has both a positive electrode disposed on a positive side of the bipolar current collector and a negative electrode disposed on a negative side of the bipolar current collector, where the positive and negative current collector sides are adjacent to one another.

In various aspects, the present disclosure provides methods of making high-power gel-assisted bipolar solid-state battery. Such solid-state batteries may be incorporated into energy storage devices, like rechargeable lithium-ion batteries, which may be used in automotive transportation applications (e.g., motorcycles, boats, tractors, buses, mobile homes, campers, and tanks). The present technology, however, may also be used in other electrochemical devices, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. In various aspects, the present disclosure provides a rechargeable lithium-ion battery that exhibits high temperature tolerance, as well as improved safety and superior power capability and life performance.

An exemplary and schematic illustration of a stack of solid-state electrochemical cells (also referred to as a "solid-state battery" and/or "battery") that cycles lithium ions is shown in FIG. 1. The battery 30 includes five (5) battery unit cells 32 in a stack configuration. In FIG. 1, the respective components are not shown to scale in dimension or thickness and further, there is spacing shown for inclusion of additional units 32 (not shown) in the stack. The battery 30 includes at least one terminal positive electrode 40 having a terminal positive current collector 42 and a positive active layer 44. The positive active layer 44 is disposed over the terminal positive current collector 42 and includes a positive electroactive material. The battery 30 also includes at least one terminal negative electrode 50 including a terminal negative current collector 52. A negative active layer 54 includes a negative electroactive material and is disposed over the terminal negative current collector 52.

The battery 30 further includes a plurality of bipolar electrodes 60, each of which includes a positive electrode 70 and a negative electrode 80 and thus has a dual polarity. The positive electrode 70 includes a positive current collector 72 and positive active layer 74 having a positive electroactive material. The bipolar electrodes 60 also each include a negative electrode 80 that include a negative current collector 82 and a negative active layer 84 having a negative electroactive material. The positive current collector 72 is disposed adjacent to the negative current collector 82. The positive electrode(s) 70 are oriented in a direction that faces towards the terminal negative electrode 50 (or an adjacent negative electrode from another bipolar electrode 60). The negative electrode(s) 80 are oriented in a direction that faces towards the terminal positive electrode 40 (or an adjacent positive electrode from another bipolar electrode 60).

The active layers 44, 74 of the positive electrodes 40, 70 are smaller than the active layers 54, 84 of the negative electrodes 50, 80 to help reduce potential short-circuiting when assembled. The terminal positive current collector 42 defines or is in contact with a positive external tab 46 that can be connected (e.g., via welding) to an external circuit 48 in electrical communication with an external load device 90. The terminal negative current collector 52 is also in electrical communication with the external circuit 48 and the load device 90. The battery 30 may include one or more polymer blockers 64 that serves as a polymeric sealant for the battery 30, and in certain variations, between opposing ends of the opposing positive current collectors 42 and negative current collectors 52.

The load device 90 may be powered by the electric current passing through circuit 48 when the battery 30 is discharging. While the electrical load device 90 may be any number of known electrically-powered devices, a few specific examples include an electric motor for an electrified vehicle, a laptop computer, a tablet computer, a cellular phone, and cordless power tools or appliances. The load device 90 may also be an electricity-generating apparatus that charges the battery 30 for purposes of storing electrical energy.

The battery 30 can generate an electric current during discharge by way of reversible electrochemical reactions that occur when the circuit 48 is closed (to connect the negative electrodes 50, 80 and the positive electrodes 40, 70) and the negative electrode has a lower potential than the positive electrode. The chemical potential difference between the positive electrodes 40, 70 and the negative electrode 50, 80 drives electrons produced by a reaction, for example, the oxidation of intercalated material, at the negative electrodes 50, 80 through the external circuit 48 towards the positive electrodes 40, 70. Lithium ions that are also produced are concurrently transferred through separator layers 62. The electrons flow through the external circuit 48 and the lithium ions migrate across the separator layers 62 and may form intercalated lithium at the positive electrodes 40, 70. As noted above, gel electrolyte is typically also present in the negative electrodes 50, 80 and positive electrode 40, 70. The electric current passing through the external circuit 48 can be harnessed and directed through the load device 90 until the lithium in the negative electrodes 50, 80 is depleted and the capacity of the battery 30 is diminished.

Each of the negative electrode current collectors 52, 82, the negative electrodes 50, 80, the separator layer 62, the positive electrodes 40, 70, and the positive electrode current collectors 42, 72 can be prepared as relatively thin layers (for example, from 1 to 2 micrometers up to 1 millimeter or less in thickness, optionally greater than or equal to about 25 micrometers to less than or equal to about 250 micrometers) in the battery 30. Thus, a plurality of bipolar electrodes 60 are disposed parallel to one another to define a stack of battery unit cells 32 disposed between a terminal positive electrode 40 and a terminal negative electrode 50. The electrodes, including the bipolar electrodes 60 and terminal electrodes 40, 50, can be assembled in layers connected in series arrangement to provide a suitable electrical energy, battery voltage and power, for example, to yield a Series-Connected Elementary Cell Core ("SECC"). In various other instances, the battery 30 may further include bipolar electrodes 60 and terminal electrodes 40, 50 connected in parallel to provide suitable electrical energy, and power for example, to yield a Parallel-Connected Elementary Cell Core ("PECC"). In various another instances, the battery 30 may further include bipolar electrodes 60 and terminal electrodes 40, 50 connected in parallel and in series to provide suitable electrical energy, voltage and power. The units connected in series or parallel can obtain a target voltage and power capacity, for example, a 12 V battery with 50 Ah capacity. Bipolar battery structures like that shown in FIG. 1 serve to improve the energy density of solid-state battery pack, for example, by reducing connecting tabs, battery packages, and the like.

As noted above, the at least one bipolar electrode assembly includes both a first current collector with a first polarity and a second current collector with a second polarity opposite from the first. By way of example, the first polarity may be a positive polarity and the second polarity may be a negative polarity. In the bipolar electrode assembly, the positive or first current collector may be a foil of aluminum. Further, the aluminum may include a carbon coating that is adjacent to the active layer. The second current collector or negative current collector may be a copper film or layer. In certain aspects, the metal layer for the positive or negative current collector together may have a combined thickness of greater than or equal to about 6 micrometers to less than or equal to about 30 micrometers. In one variation, aluminum foil may be clad over a layer of copper. In another variation, a copper film may be clad over a layer of aluminum.

The one or more positive active layers 44, 74 may each comprise a lithium-based positive electroactive material that is capable of undergoing lithium intercalation and deintercalation, absorption and desorption, alloying and dealloying, or plating and stripping, while functioning as a positive terminal of the battery 30. Generally, the positive active layers 44, 74 typically comprise the same lithium-based positive electroactive material, although they may have different compositions. As is known in the art and will be described further below, each electroactive layer (e.g., positive active layers 44, 74) may be a composite electrode that includes not only positive electroactive material particles, but also includes a polymeric binder and optionally a plurality of electrically conductive particles. Each positive active layer 44, 74 may further comprise a solid electrolyte and/or gel electrolyte mixed or distributed within the composite electrode.

In various aspects, the positive electroactive material may be a plurality of solid-state electroactive particles. In certain variations, the active layer of the positive electrode may include a positive electroactive material that is one of a layered-oxide cathode, a spinel cathode, and a polyanion cathode. For example, in the instances of a layered-oxide cathode (e.g., rock salt layered oxides), the positive solid-state electroactive particles may comprise one or more positive electroactive materials selected from $LiCoO_2$, $LiNi_xMn_yCo_{1-x-y}O_2$ (where $0\leq x\leq 1$ and $0\leq y\leq 1$), $LiNi_xMn_yAl_{1-x-y}O_2$ (where $0<x\leq 1$ and $0<y\leq 1$), $LiNi_xMn_{1-x}O_2$ (where $0\leq x\leq 1$), and $Li_{1+x}MO_2$ (where $0\leq x\leq 1$). The spinel cathode may include one or more positive electroactive materials, such as $LiMn_2O_4$ and $LiNi_{0.5}Mn_{1.5}O_4$. The polyanion cation may include, for example, a phosphate, such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$ for lithium-ion batteries, and/or a silicate, such as $LiFeSiO_4$ for lithium-ion batteries. In other aspects, the positive electroactive material may be a low voltage cathode material, such as a lithiated metal oxide/sulfide, like lithium titanate sulfide ($LiTiS_2$), lithium sulfide ($Li_2S$), sulfur, and the like. As such, the positive solid-state electroactive particles may comprise one or more positive electroactive materials selected from the group consisting of $LiCoO_2$, $LiNi_xMn_yCo_{1-x-y}O_2$ (where $0\leq x\leq 1$ and $0\leq y\leq 1$), $LiNi_xMn_yAl_{1-x-y}O_2$ (where $0<x\leq 1$ and $0<y\leq 1$), $LiNi_xMn_{1-x}O_2$ (where $0\leq x\leq 1$), $Li_{1+x}MO_2$ (where $0\leq x\leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, $LiTiS_2$, $Li_2S$, sulfur, and combinations thereof. In certain aspects, the positive solid-state electroactive particles may be coated (for example, by $LiNbO_3$ and/or $Al_2O_3$) and/or the positive electroactive material may be doped (for example, by aluminum and/or magnesium).

In certain variations, the positive electroactive layer may be a porous composite structure comprising positive electroactive particles, and optionally solid-state electrolyte particles, distributed with a polymeric binder matrix. The polymeric binder may be any of those used conventionally in the art, such as polyvinylidene difluoride (PVDF), poly (vinylidene fluoride)-co-hexafluoropropylene (PVDF-HFP), polytetrafluoroethylene (PTFE), sodium carboxymethyl cellulose (CMC), ethylene propylene diene monomer (EPDM) rubber, nitrile butadiene rubber (NBR), styrene-butadiene rubber (SBR), styrene ethylene butylene styrene copolymers (SEBS), styrene butadiene styrene copolymers (SBS), polyethylene glycol (PEO), and/or lithium polyacrylate (LiPAA) binders. In certain variations, the binder comprises polyvinylidene difluoride (PVDF) and/or poly(vinylidene fluoride-co-hexafluoropropylene (PVDF-HFP).

The porous composite structure defining the positive active layer may also include an electrically conductive material, such as a plurality of electrically conductive particles distributed therein. Electrically conductive materials may include, for example, carbon-based materials or a conductive polymer. Carbon-based materials may include, for example, particles of graphite, acetylene black (such as, KETCHEN™ black or DENKA™ black), carbon fibers and carbon nanotubes (CNTs, including single walled and multiwalled CNTs), graphene, graphene oxide, graphite, carbon black (such as, Super P™), and the like. Examples of a conductive polymer may include polyaniline, polythiophene, polyacetylene, polypyrrole, and the like. In certain aspects, the electrically conductive particle comprises a carbon black, for example, having a surface area of greater than or equal to about 50 $m^2/g$ (BET), as measured "total surface area" via the Brunauer-Ernett-Teller (BET) method using nitrogen ($N_2$). One such electrically conductive carbon black is Super P™ carbon black conductive filler commercially available from Imerys Ltd. having a surface area of greater than about 63.5 $m^2/g$ (BET). In certain other aspects, the electrically conductive particle comprises a carbon nanotube (CNT), which also has a surface area of greater than or equal to about 50 $m^2/g$. In one variation, the conductive carbon-based material may be a conductive graphite, for example, having a surface area of greater than or equal to about 5 $m^2/g$ to less than or equal to about 30 $m^2/g$ with an average diameter (D) or D50 that is less than or equal to about 8 micrometers (μm). A D50 means a cumulative 50% point of diameter (or 50% pass particle size) for the plurality of solid particles. Such a conductive graphite particle is commercially available as TIMCAL TIMREX® KS6 Synthetic Graphite. In yet other aspects, the electrically conductive particles distributed in the positive active layer may comprise both a carbon black conductive filler particle, like Super P™, and a carbon nanotube (CNT).

Each of the electrically conductive particles may be present at greater than or equal to about 0 wt. % to less than or equal to about 10 wt. %, optionally, greater than or equal to about 0.5 wt. % to less than or equal to about 10 wt. %, and in certain aspects, optionally greater than or equal to about 0 wt. % to less than or equal to about 0.5 wt. % or in alternative variations, optionally greater than or equal to about 1 wt. % to less than or equal to about 5 wt. % of a total weight of the positive active layer.

A cumulative amount of all electrically conductive particles in the positive active layer may be greater than or equal to about to about 0.5 wt. % to less than or equal to about 10 wt. %, and in certain aspects, optionally greater than or equal to about 1 wt. % to less than or equal to about 6 wt. %.

In certain aspects, the precursors of the positive electroactive material layer may be distributed in a slurry with a carrier or solvent and may have a viscosity of greater than or equal to about 1,500 to less than or equal to about 3,500 mPa·s (20 $s^{-1}$ at room temperature (approximately 21° C. (70° F.)). The slurry can be mixed or agitated, and then applied to a substrate. The substrate can be a removable substrate or alternatively a functional substrate, such as a current collector (such as a metallic grid or mesh layer). In one variation, heat or radiation can be applied to evaporate the solvent from the active material film, leaving a solid residue. The electrode film may be further consolidated, where heat and pressure are applied to the film to sinter and calendar it. In other variations, the film may be air-dried at moderate temperature to form self-supporting films. If the substrate is removable, then it is removed from the active material film that is then further laminated to a current collector. With either type of substrate, it may be necessary to extract or remove the remaining plasticizer prior to incorporation into the battery cell.

In certain variations, as will be discussed further below, the positive electrode current collector on which the composite active material layer may disposed may be in the form of a film or foil, such as a clad foil, a slit mesh, woven mesh, and the like. The positive current collector may comprise aluminum or any other suitable metal. The positive current collector can be connected to an external current collector tab.

A porosity of the composite active material layer, whether the positive or negative electrode after all processing is completed (including consolidation and calendering) may considered to be a fraction of void volume defined by pores over the total volume of the active material layer. The porosity may be greater than or equal to about 15% by volume to less than or equal to about 50% by volume, optionally greater than or equal to 20% by volume to less than or equal to about 40% by volume, and in certain variations, optionally greater than or equal to 25% by volume to less than or equal to about 35% by volume.

In certain fabrication processes, the polymer gel electrolyte is introduced into the electrodes after calendering and assembly into a stack. The pores of the porous composite structure may be at least partially filled with a polymeric gel electrolyte, as will be described further below. In various aspects, the polymeric gel electrolyte includes a non-volatile polymeric host and an electrolyte comprising solvents and lithium salts.

The negative active layers 54, 84 may each comprise a negative electroactive material that is capable of undergoing lithium intercalation and deintercalation, absorption and desorption, alloying and dealloying, or plating and stripping, while functioning as a negative terminal of the battery 30. Generally, the negative active layers 54, 84 typically comprise the same negative electroactive material, although they may have different compositions. Negative electroactive materials may be metal layers or films or may include a composite that includes negative electroactive material particles mixed with a polymeric binder and optionally a plurality of electrically conductive particles. Each negative active layer 54, 84 may further comprise a solid electrolyte and/or a gel electrolyte mixed or distributed within the composite electrode.

In various aspects, the negative electroactive material may be a plurality of solid-state electroactive particles. In certain variations, the active layer of the negative electrode may include a negative electroactive material such as graphite, hard carbon, soft carbon, silicon, lithium-silicon and silicon containing binary and ternary alloys and/or tin-containing alloys, such as Si—Sn, SiSnFe, SiSnAl, SiFeCo, $SnO_2$, lithium metal, alloys of lithium metal, and the like. In certain alternative embodiments, lithium-titanium anode materials are contemplated, such as titanium oxide ($TiO_2$), $Li_{4+x}Ti_5O_{12}$, where $0 \leq x \leq 3$, including lithium titanate ($Li_4Ti_5O_{12}$) (LTO). Metal oxide sulfides, like FeS, or other lithium-accepting anode active materials are also contemplated. Alternatively, the negative electroactive material may be a layer of lithium metal or an alloy of lithium metal. In certain variations, the negative electroactive materials for the negative active layer of the negative electrode may be selected from the group consisting of: lithium, graphite, silicon, silicon-containing alloys, tin-containing alloys, lithium titanate, and combinations thereof. In certain aspects, the plurality of solid-state negative electroactive particles may comprise graphite.

In certain variations, the negative electroactive material layer may be a porous composite structure like the positive electroactive material layer described above. The negative electroactive material layer may comprise negative electroactive particles, and optionally solid-state electrolyte particles, distributed with a polymeric binder matrix. The polymeric binder may be any of those described above in the context of the positive electrode.

The porous composite structure defining the negative active layer may also include an electrically conductive material, such as a plurality of electrically conductive particles distributed therein like those described in the context of the positive electrode material above. Each of the electrically conductive particles may be present in the negative electroactive material layer at the same levels specified above in the context of the positive electrode.

The negative electroactive material layer can be formed as a porous composite layer described in the slurry casting process in the context of the positive electroactive material. The pores of the porous composite structure of the negative electrode active layer may be at least partially filled with a polymeric gel electrolyte to be described below. Alternatively, the negative electroactive material layer may be formed by applying a relatively non-porous layer of material, such as lithium metal, via conventional processes like physical vapor deposition, chemical vapor deposition, atomic layer deposition, and the like.

The battery 30 further includes a separator layer 62 disposed between each bipolar electrode 60 and/or between one bipolar electrode 60 and the terminal electrodes (e.g., terminal positive electrode 40 or terminal negative electrode 50). For example, the separator layers 62 may be disposed between a positive active layer, for example, positive active layer 74 on a first bipolar electrode 60 and negative active layer 84 of an adjacent second bipolar electrode 60. The separator layer 62 may be a microporous separator, a solid-state electrolyte layer, or a free-standing independent polymer gel layer that is formed of a polymer and liquid electrolyte, meaning that it is self-supporting with structural integrity and can be handled as an independent layer (e.g., removed from a substrate) rather than only being a coating formed on another element.

In certain instances, the separator layer 62 may be a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous separator membranes include CELGARD®2500 (a monolayer polypropylene separator) and CELGARD®2320 (a trilayer polypropylene/polyethylene/polypropylene separator) available from Celgard LLC.

In certain aspects, the separator layer 62 may further include one or more of a ceramic coating layer comprising ceramic particles and a heat-resistant material coating. The ceramic coating layer and/or the heat-resistant material coating may be disposed on one or more sides of the separator layer 62. The material forming the ceramic layer may be selected from the group consisting of: alumina ($Al_2O_3$), silica ($SiO_2$), and combinations thereof. The heat-resistant material may include aromatic polyamides (which are also known as aramids). For example, in certain variations, the heat-resistant material may include NOMEX® aramid.

When the separator layer 62 is a microporous polymeric separator, it may be a single layer or a multi-layer laminate, which may be fabricated from either a dry or a wet process. For example, in certain instances, a single layer of the polyolefin may form the entire separator layer 62. In other aspects, the separator layer 62 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator layer 62.

The separator layer 62 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator layer 62 as a fibrous layer to help provide the separator 26 with appropriate structural and porosity characteristics. In certain aspects, the separator layer 62 may also be mixed with a ceramic material or its surface may be coated in a ceramic material. For example, a ceramic coating may include aluminum oxide/alumina ($Al_2O_3$), silicon dioxide ($SiO_2$), titanium oxide/titania ($TiO_2$) or combinations thereof. Various conventionally available polymers and commercial products for forming the separator layer 62 are contemplated, as well as the many manufacturing methods that may be employed to produce such a microporous polymer separator layer 62.

In lieu of a traditional separator, the separator layer 62 may instead be a free-standing elastic gel separator interlayer may be disposed between the negative electrodes and the positive electrodes. Such a polymeric gel separator layer may be a gel-like solid (or semi-solid) electrolyte in which an electrolyte (e.g., a salt in a solvent) is held in a matrix or network, for example, by interacting via bonding forces with the surrounding polymeric matrix. The gel separator layers may be porous and can provide electrical separation between electrodes of opposite polarities, but to permit ions to flow therethrough. The free-standing gel separator layer(s) may serve the role of both electrical insulator and ion conductor and thus eliminate the need for a traditional porous separator layer. The free-standing polymeric gel separator layer may be porous but has comparatively lower porosity than a conventional polyolefin separator.

In other variations, the separator layer 62 in FIG. 1 may be replaced with a solid-state electrolyte (SSE) (not shown) that functions as both an electrolyte and a separator. The SSE may be disposed between each positive electrode and negative electrode. The SSE facilitates transfer of lithium ions, while mechanically separating and providing electrical insulation between the negative and positive electrodes. The SSE may be a solid-state inorganic compound or a solid-state polymer electrolyte.

By way of non-limiting example, solid-state electrolyte particles may include oxide-based solid electrolyte particles, sulfide-based solid electrolytes, nitride-based solid electrolytes, hydride-based solid electrolytes, halide-based solid electrolytes, borate-based solid electrolytes, and combinations thereof. More specifically, examples of suitable solid electrolyte particles include garnet type oxides (e.g., $Li_7La_3Zr_2O_{12}$(LLZO)), perovskite type (e.g., $Li_3$ $xLa_{2/3-x}TiO_3$), NASICON type (e.g., $Li_{1.4}Al_{0.4}Ti_{1.6}(PO_4)_3$ and $Li_{1+x}Al_xGe_{2-x}(PO_4)_3$ where $0 \leq x \leq 2$ LISICON type (e.g., $Li_{2+2x}Zn_{1-x}GeO_4$ where $0 \leq x \leq 1$), metal-doped or aliovalent-substituted oxide solid electrolyte, such as Al-doped or Nb-doped $Li_7La_3Zr_2O_{12}$, Sb-doped $Li_7La_3Zr_2O_{12}$, Ga-substituted $Li_7La_3Zr_2O_{12}$, Cr and V-substituted $LiSn_2P_3O_{12}$, Al-substituted perovskite, $Li_{1+x+y}Al_xTi_{2-x}Si_yP_{3-y}O_{12}$ where $0 \leq x \leq 2$ and $0 \leq y \leq 3$, sulfide-based solid electrolyte, e.g., $Li_2S—P_2S_5$ system, $Li_2S—P_2S_5$-$MO_x$ system, where M is a metal element, such as zinc (Zn), tin (Sn), and the like and X is 2, $Li_{10}GeP_2S_{12}$ (LGPS), thio-LISICON ($Li_{3.25}Ge_{0.25}P_{0.75}S_4$), $Li_{3.4}Si_{0.4}P_{0.6}S_4$, $Li_{10}GeP_2S_{11.7}O_{0.3}$, lithium argyrodite $Li_6PS_5X$ where X is a halide, such as Cl, Br, or I, $Li_{9.54}Si_{1.74}P_{1.44}S_{11.7}Cl_{0.3}$, $Li_{9.6}P_3S_{12}$, $Li_7P_3S_{11}$, $Li_9P_3S_9O_3$, $Li_{10.35}Ge_{1.35}P_{1.65}S_{12}$, $Li_{10.35}Si_{1.35}P_{1.65}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.166}S_4$, LiI—$Li_4SnS_4$, and $Li_4SnS_4$, $Li_3N$, $Li_7PN_4$, $LiSi_2N_3$, hydride-based solid electrolyte, like $LiBH_4$, $LiBH_4$—LiX, where X is Cl, Br or I, $LiNH_2$, $Li_2NH$, $LiBH_4—LiNH_2$, $Li_3AlH_6$, a halide-based solid electrolyte, LiI, $Li_3InCl_6$, $Li_2CdC_{14}$, $Li_2MgCl_4$, $Li_2CdI_4$, $Li_2ZnI_4$, $Li_3OCl$, borate-based solid electrolytes, e.g., $Li_2B_4O_7$, $Li_2O—B_2O_3—P_2O_5$, and any combinations thereof. In addition to forming an electrolyte layer between the positive and negative electrodes, as noted above, solid electrolyte particles like those described above may be included in the electrodes themselves (for example, mixed in with other components distributed within a polymeric binder matrix to form a composite electrode).

In various aspects, the lithium-ion battery 30 may include a polymer gel electrolyte 92 capable of conducting lithium ions between the respective negative and positive electrodes. The polymer gel electrolyte 92 may be included in one or more of the positive electrodes (e.g., terminal positive electrode 40, positive active layers 74), negative electrodes (e.g., terminal negative electrode 50, negative active layers 84) and porous separator layers 62, for example, disposed inside at least a portion of their pores. However, additional appropriate electrolyte, whether in solid, liquid, or gel form, capable of conducting lithium ions between the respective negative and positive electrodes may be used in the lithium-ion battery 30. In certain alternative aspects, in addition to the polymer gel, the electrolyte 92 may also include a solid-state electrolyte particles or non-aqueous liquid electrolyte solution that includes a lithium salt dissolved in an organic solvent or a mixture of organic solvents that flows (and does not interact with the polymeric host blend in the gel electrolyte).

However, in certain aspects, the electrochemical cells and batteries prepared in accordance with certain aspects of the present disclosure may be free of liquid electrolytes and only contain solid-state and/or semi-solid or gel electrolytes (polymer gel electrolyte 92). While liquid electrolyte is used initially as a precursor to form the polymeric gel electrolyte in the methods of the present disclosure, the liquid electrolyte is imbibed into and specifically interacts with the polymeric host, for example, by bonding with the polymeric blend polymers via hydrogen bonding, Van der Waals forces, and the like. Thus, the liquid electrolyte (comprising lithium salt) is bound and no longer flows, thus serving as part of the gel electrolyte through the bonding with the surrounding polymer host matrix. As a result, the incorporated liquid electrolyte provides a non-flowing property, in contrast to conventional liquid electrolyte that flows within pores of conventional separators and electrodes. By replacing liquid electrolyte with non-flammable gel electrolyte that does not flow within the battery, the thermal stability of the battery is greatly enhanced.

Thus, the polymer gel electrolyte 92 may be a gel-like solid (or semi-solid) electrolyte in which an electrolyte (e.g., a salt in a solvent) is held in a matrix or network. The pores of the porous structures in the lithium-ion battery 30 may be at least partially filled with the polymer gel electrolyte 92. In various aspects, the polymeric gel electrolyte includes a non-volatile polymeric an electrolyte (e.g., a salt in a solvent), and a lithium salt. By way of example, the polymeric host may be polyvinylidene fluoride (PVdF), polyvinylidene fluoride copolymers (e.g., PVdF-hexafluoropropylene or (PVdF-HFP)), polyacrylonitrile (PAN), polymethylmethacrylate (PMMA), and oligomers, copolymers, and combinations thereof.

In certain variations, the polymeric host may be a polyalkylene oxide, such as polyethylene oxide (PEO) or polypropylene oxide (PPO). In one variation, the polymeric host comprises polyethylene oxide (PEO). The polymeric host may be present at greater than 0 wt. % to less than or equal to about 20 wt. %, optionally greater than or equal to about 1 wt. % to less than or equal to about 15 wt. 00 optionally greater than or equal to about 2 wt. % to less than or equal to about 10 wt. 00 optionally greater than or equal to about 2 wt. % to less than or equal to about 8 wt. 00 optionally greater than or equal to about 2 wt. % to less than or equal to about 6 wt. 00 optionally greater than or equal to about 4 wt. % to less than or equal to about 6 wt. %, for example, at about 5 wt. % of the total weight of the polymeric gel electrolyte.

The polymer gel electrolyte 92 may have a liquid electrolyte distributed therein, which when the liquid electrolyte is imbibed in the polymeric host, it forms a semi-solid or non-flowing gel phase overall. The electrolyte distributed within the polymer gel electrolyte 92 may include a lithium salt and a solvent. The lithium salt includes a lithium cation ($Li^+$) and at least one anion selected from the group consisting of hexafluorophosphate, bis(fluorosulfonyl)imide (FSI), perchlorate, tetrafluoroborate, cyclo-difluoromethane-1,1-bis(sulfonyl)imide (DMSI), bis(oxalate)borate (BOB), difluoro(ocalato)borate (DFOB), bis(fluoromalonato)borate (BFMB), and combinations thereof. For example, in certain variations, the lithium salt may be selected from the group consisting of lithium bis(trifluoromethanesulfonyl)imide (LiTFSI), lithium bis(fluorosulfonyl)imide (LiFSI), hexafluoroarsenate, bis(trifluoromethanesulfonyl) imide (TFSI), bis(pentafluoroethanesulfonyl)imide (BETI), lithium hexafluoroarsenate ($LiAsF_6$), lithium hexafluorophosphate ($LiPF_6$), lithium bis(pentafluoroethanesulfonyl) imide (LiBETI), lithium bis(oxalato)borate (LiBOB), lithium difluoro(oxalato)borate (LiDFOB), lithium tetrafluoroborate ($LiBF_4$), lithium perchlorate ($LiClO_4$), lithium trifluoromethyl sulfonate (LiTFO), lithium-cyclo-difluoromethane-1,1-bis(sulfonyl)imide (LiDMSI), lithium bis(monofluoromalonato)borate (LiBFMB), lithium difluorophosphate ($LiPO_2F_2$), lithium fluoride (LiF), lithium difluoro(oxalato)borate (LiDFOB), and combinations thereof.

The lithium salt may include, for example, lithium tetrafluoroborate ($LiBF_4$), lithium bis(trifluoromethanesulfonyl)imide (LiTFSI), and combinations thereof. In certain variations, the lithium salt may include both bis (trifluoromethanesulfonyl)imide (LiTFSI) and lithium tetrafluoroborate ($LiBF_4$).

Each respective lithium salt may be present at greater than or equal to about 0.01 M to less than or equal to about 5 M, optionally greater than or equal to about 0.1 M to less than or equal to about 1.0 M, optionally greater than or equal to about 0.15 M to less than or equal to about 0.6 M, optionally about 0.5 M in the electrolyte.

A cumulative amount of all lithium salt(s) present in the polymeric gel electrolyte may be greater than or equal to about 0.5 M to less than or equal to about 10M, optionally at greater than or equal to about 0.8 M to less than or equal to about 5 M, optionally greater than or equal to about 0.9 M to less than or equal to about 2 M, and in certain aspects, optionally about 1.0 M in the liquid electrolyte.

A cumulative amount of the lithium salts in the polymer gel electrolyte may be greater than or equal to about 10 weight % to less than or equal to about 20 weight % of a total weight of the polymer gel electrolyte. In certain aspects, a cumulative amount of the lithium salts in the polymer gel electrolyte may be greater than or equal to about 13 wt. % to less than or equal to about 17 wt. % of a total amount of lithium salts.

In certain variations, the lithium salts include both bis (trifluoromethanesulfonyl)imide (LiTFSI) and lithium tetrafluoroborate ($LiBF_4$). By way of example, in one variation, the electrolyte may include 0.5 M LITFSI and 0.5 M $LiBF_4$.

One or more solvents in the electrolyte can dissolve the lithium salt to enable good lithium ion conductivity. The one or more solvents are desirably compatible with the polymeric host and exhibit a low vapor pressure (e.g., less than about 10 mmHg at 25° C.) and a high boiling point (e.g., higher than 80° C.) to correspond to the cell fabrication process conditions. In various aspects, the solvent includes, for example, carbonate solvents (such as, ethylene carbonate (EC), diethylene carbonate (DEC), vinyl ethylene carbonate (VEC), dimethylene carbonate (DMC), ethylmethylene carbonate (EMC), propylene carbonate (PC), glycerol carbonate, vinylene carbonate (VC), fluoroethylene carbonate (FEC), 1,2-butylene carbonate (BC), and the like), lactones (such as, γ-butyrolactone (GBL), δ-valerolactone, and the like), nitriles (such as, succinonitrile, glutaronitrile, adiponitrile, and the like), sulfones (such as, tetramethylene sulfone, ethyl methyl sulfone, vinyl sulfone, phenyl sulfone, 4-fluorophenyl sulfone, benzyl sulfone, and the like), ethers (such as, triethylene glycol dimethylether (triglyme, G3), tetraethylene glycol dimethylether (tetraglyme, G4), 1,3-dimethyoxy propane, 1,4-dioxane, and the like), phosphates (such as, triethyl phosphate, trimethyl phosphate, and the like), ionic liquids including ionic liquid cations (such as, 1-ethyl-3-methylimidazolium ($[Emim]^+$), 1-propyl-1-methylpiperidinium ($[PP_{13}]^+$), 1-butyl-1-methylpiperidinium ($[PP_{14}]^+$), 1-methyl-1-ethylpyrrolidinium ($[Pyr_{12}]^+$), 1-propyl-1-methylpyrrolidinium ($[Pyr_{13}]^+$), 1-butyl-1-methylpyrrolidinium ($[Pyr_{14}]^+$), and the like) and ionic liquid anions (such as, bis(trifluoromethanesulfonyl)imide (TFSI), bis (fluorosulfonyl imide (FS), polystyrene (PS), and the like and combinations thereof.

In various aspects, the solvent may be selected from, for example, ethylene carbonate (EC), diethylene carbonate (DEC), ethylmethylene carbonate (EMC), vinyl ethylene carbonate (VEC), dimethylene carbonate (DMC), vinylene carbonate (VC), and polystyrene (PS), and combinations thereof. In one variation, the solvents include ethylene carbonate (EC), diethylene carbonate (DEC), ethylmethylene carbonate (EMC), vinyl ethylene carbonate (VEC), dimethylene carbonate (DMC), vinylene carbonate (VC), and polystyrene (PS).

The polymer gel electrolyte may comprise a total of greater than or equal to about 75 weight % to less than or equal to about 99 weight %, optionally greater than or equal to about 80 weight % to less than or equal to about 95 weight %, or optionally greater than or equal to about 82 weight % to less than or equal to about 90 weight %, for example, about 85 weight % of solvents. For example, in certain variations, the electrolyte may include greater than or equal to about 10 wt. % to less than or equal to about 20 wt. %, and in certain aspects, optionally greater than or equal to about 13 wt. % to less than or equal to about 17 wt. % of a total amount of lithium salts, and greater than or equal to about 80 wt. % to less than or equal to about 95 wt. %, and in certain aspects, optionally greater than or equal to about 82 wt. % to less than or equal to about 90 wt. % of a total amount of the solvents.

In certain aspects, three carbonate solvents may be included in the electrolyte, ethylene carbonate (EC), diethylene carbonate (DEC), and ethylmethylene carbonate (EMC). A volumetric ratio of a first solvent, such as EC, to a second solvent, such as DEC, to a third solvent, such as EMC, may be greater than or equal to about 1:1:1. In one variation, the polymer gel electrolyte may include greater than or equal to about 80 weight % to less than or equal to about 95 weight % of solvents, including about 82 weight % to about 90 weight % of a 1:1:1 volume ratio mixture of ethylene carbonate (EC), diethylene carbonate (DEC), ethylmethylene carbonate (EMC), with about 1 weight % vinylene carbonate (VC), about 0.5 weight % vinyl ethylene carbonate (VEC), and about 1.5 weight % polystyrene (PS). In this solvent mixture, 0.5 M LITFSI and 0.5 M $LiBF_4$ can be added.

In other aspects, the polymer gel electrolyte may include ionic liquids. For example, in certain variations, the electrolyte may comprise a solvated ionic liquid, which may include tetraethylene glycol dimethyl ether (G4, or tetraglyme), triethylene glycol dimethyl ether (G3 or triglyme) and one of more of the lithium salts described above, by way of example, a lithium salt selected from the group consisting of: LiTFSI, LIFSI, LiBETI, $LiPF_6$, LiBOB, LiDFOB, $LiBF_4$, $LiAsF_6$, $LiClO_4$, LiTfO, and combinations thereof.

In another variation, the electrolyte may comprise an aprotic ionic liquid, which may have at least one cation selected from the group: N-methyl-N-propylpiperidinium ($PP13^+$), N-methyl-N-butylpiperidinium ($PP14^+$), N-methyl-N-propylpyrrolidinium ($Py13^+$), 1-ethyl-3-methylimidazolium ($EMI^+$), and combinations thereof. The aprotic ionic liquid may have at least one anion selected from the group consisting of: bis(fluorosulfonyl)imide ($FSI^-$), bis (trifluoromethanesulfonyl)imide ($TFSI^-$), bis(pentafluoroethanesulfonyl)imide ($BETI^-$), hexafluorophosphate ($PF_6^-$), tetrafluoroborate ($BF_4^-$), trifluoromethyl sulfonate ($TfO^-$), difluoroborate ($DFOB^-$), and combinations thereof, and lithium ions.

These ionic liquids may further comprise at least one of diluent additives, including 1,1,2,2-tetrafluoroethyl-2,2,3,3-tetrafluoropropyl ether (HFE), fluoroethylene carbonate (FEC), TTE, and combinations thereof.

In certain aspects, the present disclosure provides a precursor of the polymeric gel electrolyte that may include a polymer precursor (e.g., monomers, oligomers, polymers), an initiator, and a liquid electrolyte including one or more lithium salts and one or more solvents. In certain aspects, the precursor comprises greater than 0 to less than or equal to about 5 weight % of an initiator, for example, about 0.5 weight % initiator, greater than 0 to less than or equal to about 20 weight % of a polymer precursor species, for example, about 5 weight % of a polymer precursor species, and greater than or equal to about 80 weight % to less than or equal to about 99 weight % of liquid electrolyte, for example, about 90 weight % of liquid electrolyte that includes both solvents and lithium salts. A viscosity of the polymer precursor may be such that it is injectable and flows during processing and may be a liquid or a semi-liquid.

The polymer precursor species may be a precursor of any of those described above, for example, a monomer and/or an oligomer of any of the polymers described above. The liquid electrolyte may include any of the solvents and lithium salts described above. The initiators may facilitate a polymerization and/or crosslinking reaction between oligomers or other precursor polymer species, like monomers. Suitable initiators include peroxides, such as di(4-tert-butylcyclohexyl) peroxydicarbonate, benzoyl peroxide (BPO), azo compounds, such as azodicyandiamide (ANBI), peroxide and a reducing agent (e.g., low-valence metal salts, such as $S_2O_4^{2+}$, $Fe^{2+}$, $Cr^{3+}$, $Cu^{+}$, and the like.)

Figure 2:
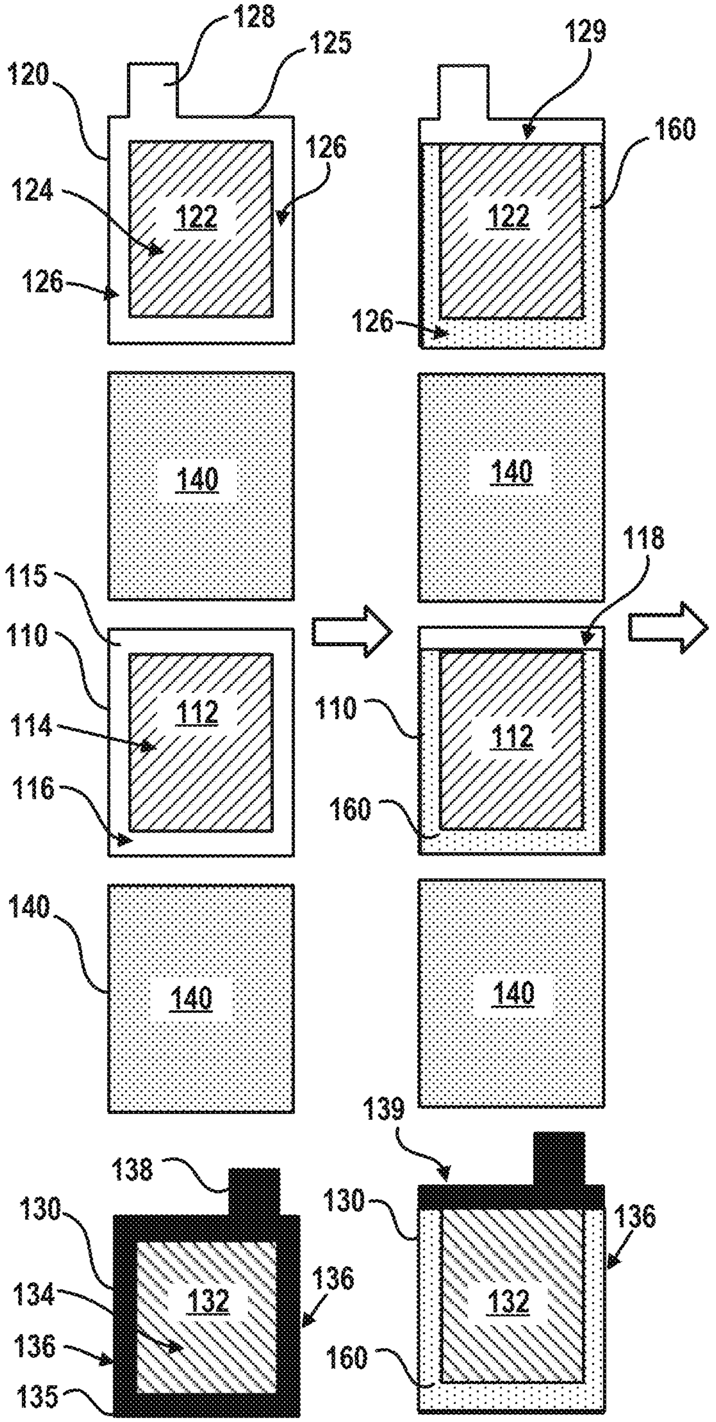
FIG. 2 shows a plan view initial steps of a method of forming a battery via in situ polymerization in accordance with the present disclosure, where a first blocker composition precursor is applied to various components of a stack prior to assembly.
Figure 3:
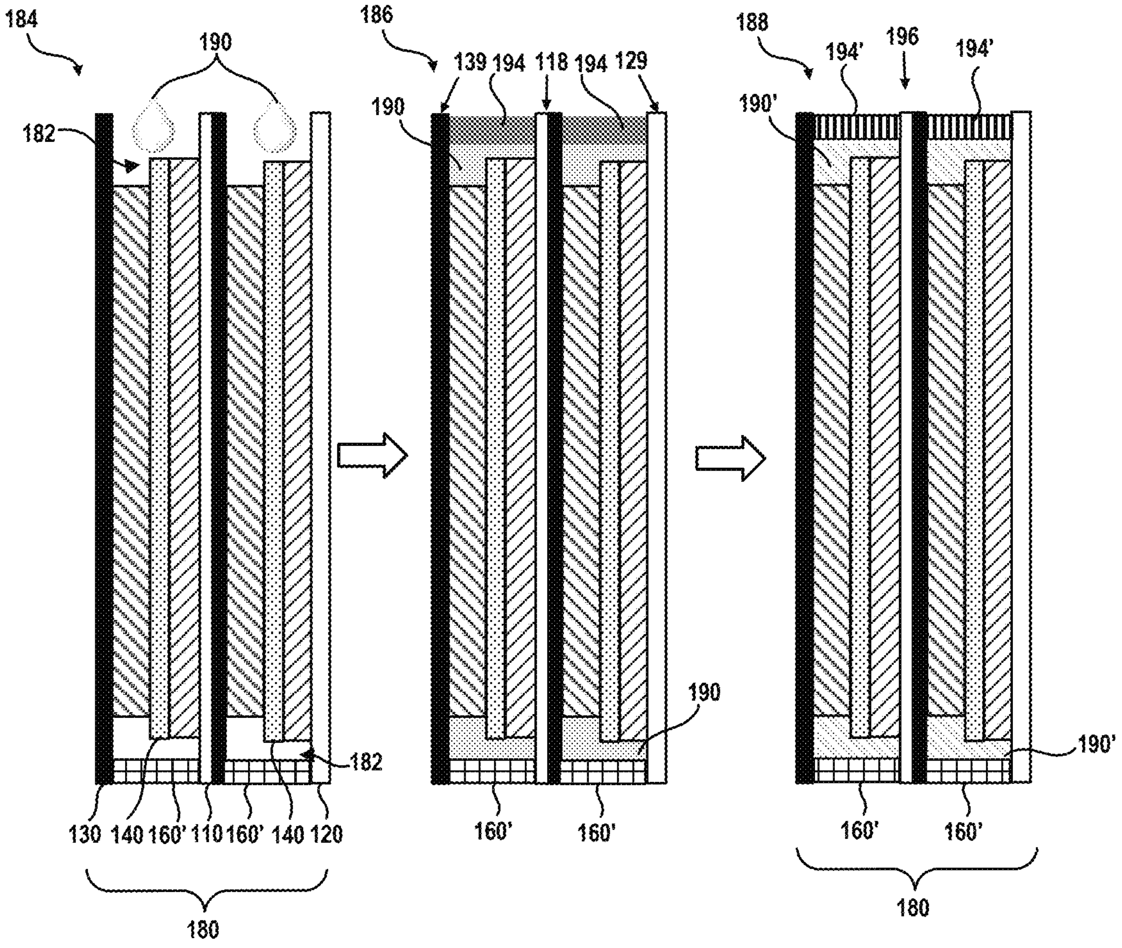
FIG. 3 shows a side sectional view of subsequent steps of the method of forming a battery via in situ polymerization shown in FIG. 2 in accordance with the present disclosure, where a precursor of a polymer gel electrolyte and a second blocker composition precursor are applied to various components of an assembled stack for a one-step polymerization process to form a sealed stack having polymer gel electrolyte formed therein.

In various aspects, the present disclosure contemplates methods of using such a precursor of the polymeric gel electrolyte to inject it into a pseudo-pouch and form polymeric gel based bipolar batteries. A method of forming a battery via in situ polymerization such as a fabrication process like that shown in FIGS. 2 and 3 is contemplated in certain variations. FIG. 2 shows initial steps of the fabrication process viewing the preassembled components of a battery cell, while FIG. 3 shows the later steps of the fabrication process after the battery cell components are assembled adjacent to one another. As best seen in FIG. 2 that includes the various components prior to assembly, the fabrication process may include providing at least one bipolar electrode component 110 (with the negative side shown in FIG. 2), a terminal negative electrode 120, and a terminal positive electrode 130. The battery also includes at least two insulating interlayers 140 that when assembled will be disposed between electrodes of opposite polarities to form a stack 180 (best seen in FIG. 3 where the components are assembled together). As noted above, the insulating layers 140 may be a microporous separator, polymer gel separator, solid-state electrolyte layer, or the like. For example, one insulating layer 140 may be disposed between a negative side of a bipolar electrode component 110 and a terminal positive electrode 130 (or while not shown, instead of a terminal positive electrode 130, a positive electrode of an adjacent bipolar electrode component 110) and another insulating layer 140 may be disposed between a positive side of the bipolar electrode component 110 and the terminal negative electrode 120 (or while not shown, a negative electrode of an adjacent bipolar electrode component 110).

The bipolar electrode component 110 has an electroactive material 112 disposed in a central region 114 of a bipolar current collector 115, so that edge regions 116 surrounding the central region 114 of the current collector 110 remain uncoated. Likewise, the terminal negative electrode 120 has a negative electroactive material 122 disposed in a central region 124 of a negative current collector 125, while edge regions 126 remain uncoated. As shown, the negative current collector 125 defines a tab 128. The terminal positive electrode 130 has a positive electroactive material 132 disposed in a central region 134 of a positive current collector 135, while edge regions 136 remain uncoated. The positive current collector 135 defines a tab 138. Each component, namely the bipolar electrode component 110, the terminal negative electrode 120, and the terminal positive electrode 130 may define four sides near/adjacent to the uncoated edge regions 116, 126, 136.

A liquid or semi-liquid precursor of a first blocker composition 160 may be applied to terminal or edge regions 116, 126 and 136 of each of three sides, while leaving a fourth side untreated and uncoated. As will be appreciated, while not shown, the precursor of the first blocker composition 160 may be applied to both negative and positive sides of the bipolar electrode component 110 terminal edges.

Thus, first, second, and third sides along the terminal or edge regions 116, 126, 136 of each of the bipolar electrode component 110, the terminal negative electrode 120, and the terminal positive electrode 130 having the precursor of the first blocker composition 160 can be reacted (e.g., polymerized, cured, and/or cross-linked) to form a solid first blocker composition 160', so that when the components are assembled and brought adjacent to or in contact with one another, the first blocker composition serves as a polymeric sealant along those three sides. The blocker compositions of the present disclosure may comprise a polymer or a polymeric composite of a polymeric matrix having reinforcing materials distributed in the polymer that serves as a seal for an interior of the battery and thus serves to retain the various components, including any gels (e.g., gel electrolyte) disposed therein. Notably, the precursor of the blocker composition may be exposed to heat or may be further reacted by exposing the layer to actinic (e.g., UV) radiation and the like. A fourth side 118 of the bipolar electrode component 110 (e.g., on both the positive and negative side), a fourth side 129 of the terminal negative electrode 120, and a fourth side 139 of the terminal positive electrode 130 remain uncoated and unsealed by the first blocker composition 160. In this manner, the fourth sides 129, 118, and 139 provide access to the interior of the assembled cell or stack.

As shown in FIG. 3, the methods of the present disclosure may thus include first assembling the bipolar electrode 110, the terminal negative electrode 120, and the terminal positive electrode 130 with at least two insulating interlayers 140 disposed between electrodes of opposite polarities to form the stack 180 defining four sides (not shown in the view of FIG. 3, but shown in the preassembled view of FIG. 2). The method includes reacting the precursor of the first blocker composition 160 to form a first blocker composition 160' sealing the first side, the second side, and the third side (in FIG. 3, only shown sealing the bottom or second side). The reacting may occur at greater than or equal to about 60° C. to less than or equal to about 120° C., optionally greater than or equal to about 75° C. to less than or equal to about 100° C., for greater than or equal to about 5 minutes, optionally greater than or equal to about 10 minutes, optionally greater than or equal to about 30 minutes, and optionally greater than or equal to about 1 hour. By way of an example, in one variation, the reaction occurs at 100° C. for 2 hours. Together, the sealed three sides define a fillable interior region 182.

As shown at 184, a precursor of a polymer electrolyte 190 is injected or otherwise introduced into the fillable interior region 182. The precursor of the polymer electrolyte 190 can infiltrate open spaces or voids in the interior region 182, as well as infiltrating open pores within the porous components (e.g., a porous electroactive material, within the porous insulating layer 140, and the like). In this manner, the present technology provides a new "pouch" that minimizes or avoids solvent evaporation when the precursor of the polymer electrolyte 190 is injected into the interior region.

As shown at 186, a precursor of a second blocker composition 194 is applied to an edge or terminal region along the fourth sides 129, 118, and 139.

As shown at 188, the method then includes reacting the precursor of the polymer electrolyte 190 to form a polymer electrolyte 190' within the stack 180. The method also includes reacting the precursor of the second blocker composition 194 to form a second polymeric sealant of the second blocker composition 194' along a fourth side 196 defined by the stack 180. In certain aspects, the method includes concurrently reacting the precursor of the polymer electrolyte 190 and the precursor of the second blocker composition 194 to form concurrently the polymer electrolyte 190' and the second blocker composition 194'. This can provide a single step for polymerizing and sealing the stack. In this example, the reacting may occur at greater than or equal to about 80° C. to less than or equal to about 90° C. for greater than or equal to about 30 minutes to less than or equal to about 3 hours, for example, about 2 hours. In certain variations, the reacting may occur for about 80° C. for about 2 hours. In this manner, the first blocker composition 160' defines a first sealant and the second blocker composition 194' defines the second sealant to define a sealed pouch. The stack 180 is thus sealed and comprises the polymer electrolyte 190' with the other components. The precursor of the first blocker composition 160 and the precursor of the second blocker composition 194 may be the same composition or different. The composition of the second blocker composition 194 is selected to have compatible reaction/polymerization conditions, as those required for the polymer gel electrolyte precursor 190.

The first blocker composition 160' and the second blocker composition 194' span between surfaces of respective components, for example, between bipolar electrodes 110 (where multiple bipolar electrode components are present) or between bipolar electrodes 110 and a terminal positive electrode 130 or terminal negative electrode 120. In one aspect, the first blocker composition 160' and the second blocker composition 194' may have a thickness independently selected from greater than or equal to about 2 micrometers to less than or equal to about 200 micrometers. The first blocker composition 160' and the second blocker composition 194' may be epoxy-based composites. The precursors of the first blocker composition 160 and the second blocker composition 194 may comprise greater than or equal to about 70 weight % epoxy resin and less than or equal to about 10 weight % curing agent and greater than or equal to about 20 weight % inorganic filler. An epoxy resin may be a bisphenol A diglycidyl ether having a formula of $(C_{11}H_{12}O_3)_n$, where $2 \leq n \leq 4$, for example, represented by a structure:

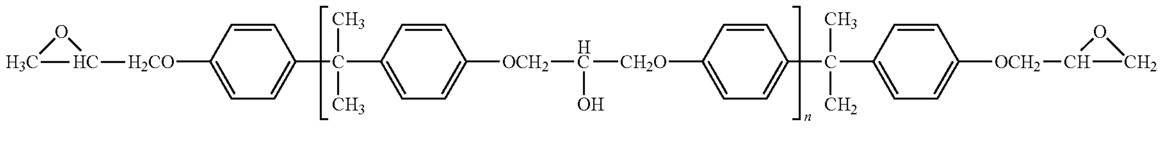

The curing agent may be a polyether amine-based curing agent, such as $(CH_3O)_nCH_7N_2$ having a structure represented by:

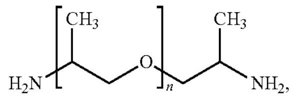

where n is greater than or equal to 2. The inorganic filler may be selected from the group consisting of: silicon dioxide ($SiO_2$), aluminum oxide ($Al_2O_3$), zirconium oxide ($ZrO_2$), aluminum oxide hydroxide (γ-AlOOH), titanium dioxide ($TiO_2$), and combinations thereof. In one variation, the first and second blocker compositions may comprise about 60 weight % of a bisphenol A diglycidyl ether, about 15 weight % of a polyether amine-based curing agent, and about 25 weight % of aluminum oxide ($Al_2O_3$) particles.

As will be appreciated by those of skill in the art, the battery stack 180 is not limited to the number, configuration, or orientation of components shown and further may comprise a variety of additional components, including seals, gaskets, terminal plates, caps, and the like, by way of non-limiting example.

The processes provided by the present disclosure provide a well-formed gel electrolyte in a well-sealed pouch cell that minimizes or avoids gel leakage from the stack. Such a method thus forms a battery via in situ polymerization including at least one bipolar component. This process can advantageously use current fabrication lines with improved efficiency and capability to scale up, as compared to traditional processes of forming gel polymer electrolyte.

Moreover, any need to scrub or remove excess polymers is eliminated, as is required for current processes of forming gel electrolyte stacks. In current processes, initially polymer gel electrolyte precursor is incorporated by spraying or dipping the polymer over the surfaces of the various components, which is then polymerized or reacted. However, then, the polymer gel electrolyte must be selectively removed by scrubbing the edges of the current collector so that it only remains in the central regions. This is followed by selectively applying a blocker composition to the edges where the polymer gel electrolyte has been removed. This is done on all four sides and then the stack is sealed by a polymerization process. However, the process involves many steps, which can be eliminated or streamlined in the present process. Further, any reduction of solvent from the polymer gel electrolyte is eliminated.

Thus, in certain embodiments the present application provides the gel-assisted bipolar battery design described herein that cycles lithium ions. Such gel-assisted bipolar solid-state battery may be a high-power battery delivering excellent power capability, high temperature durability and superior cold performance, and is particularly suitable for certain under-hood vehicle applications, such as 12 V start/stop battery. The battery includes a first terminal electrode having a first polarity, for example, a positive electrode or cathode. The battery also includes a second terminal electrode having a second polarity opposite from the first polarity, for example, a negative electrode or anode. The battery further includes at least one bipolar electrode assembly disposed between the first terminal electrode and the second terminal electrode. The bipolar electrode assembly has a first electrode with the first polarity and a second electrode with the second polarity opposite to the first polarity. The first electrode includes a first current collector and a first active layer. The first active layer includes a first electroactive material (e.g., a plurality of first electroactive material particles) that reversibly cycles lithium ions, and a first polymer gel electrolyte distributed therein. The first active layer may also include a first solid-state electrolyte (e.g., a plurality of solid-state electrolyte particles) distributed therein. The bipolar electrode assembly is oriented so that the first electrode with the first polarity faces the second terminal electrode with the opposite second polarity.

The battery also includes a plurality of electrically insulating, but ionically conductive separating interlayers disposed between electrodes of opposite polarities.

Example

In one example, a one-step polymerization and sealing process may be occur as follows. About 96.8 weight % of a liquid electrolyte and about 3 weight % of a polymer precursor are combined as a gel electrolyte precursor. The liquid electrolyte includes 0.5M $LiBF_4$ and 0.5M LiTFSI in a solvent mixture of EC:DEC:EMC (1:1:1, v:v:v) with a balance of about 1 weight % VC, about 0.5 weight % VEC and about 1.5 weight % PS. The polymer precursor is a monomer or oligomer of polyethylene oxide (PEO) and/or ethylene oxide (EO) monomers. In certain variations, the polymer precursor comprises a PEO oligomer. The liquid electrolyte and the polymer precursor may be mixed, for example at a mixing speed of about 200 rpm in an inert (argon) atmosphere for about 10 to 12 hours. Next, about 0.2 weight % of an initiator is added to the admixture and further mixing may be conducted in an inert (Ar) atmosphere, for a period of about 3 hours or longer. This gel electrolyte precursor solution can then be injected into a stack of components previously sealed on three sides with the first epoxy-based blocker composition. Next, the second epoxy-based blocker composition may be applied to the top edges of the stack, followed by a reaction process, for example exposing the stack with the gel electrolyte precursor to 80° C. for about 2 hours. This results in a well-formed gel electrolyte without leakage.

Testing of the pouch cell at different performance rates (1 C at 25° C., 2 C, 5 C, and 10 C) show at least 70% capacity retention, even at 1° C. rate. Similarly, good discharge performance at low temperatures (−18° C.) is also observed. Advantageously, there is no negative impact on performance of the battery cell in the pouch, despite being subjected to the one-step copolymerization process of the second blocker composition and the gel electrolyte at 80° C.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a battery via in situ polymerization, the method comprising:

applying a first blocker composition precursor to select edge regions of at least one bipolar electrode, a terminal negative electrode, and a terminal positive electrode, the select edge regions of the at least one bipolar electrode defined by a first current collector, the select edge regions of the terminal negative electrode defined by a second current collector, and the select edge regions of the terminal positive electrode defined by a third current collector;

assembling the at least one bipolar electrode, the terminal negative electrode, and the terminal positive electrode with at least two insulating interlayers disposed between electrodes of opposite polarities to form a stack defining a first side, a second side, a third side, and a fourth side, the first, second, and third current collectors each having a height that is greater than a height of the stack;

reacting the first blocker composition precursor to form a first blocker composition sealing only the first side, the second side, and the third side that together define a fillable interior region, the fourth side being unsealed by the first blocker composition;

injecting a precursor of a polymer electrolyte into the fillable interior region via the fourth side;

applying a second blocker composition precursor to a terminal region of the fourth side; and concurrently reacting the precursor of the polymer electrolyte and the precursor of the second blocker composition to form a polymer electrolyte within the stack and a second blocker composition sealing the fourth side, the first blocker composition and the second blocker composition defining a sealed pouch that comprises the stack comprising the polymer electrolyte.

2. The method of claim 1, wherein the concurrently reacting the precursor of the polymer electrolyte and the precursor of the second blocker composition occurs at greater than or equal to about 80° C. to less than or equal to about 90° C. for greater than or equal to about 30 minutes to less than or equal to about 3 hours.

3. The method of claim 1, wherein the first blocker composition and the second blocker composition each have a thickness independently selected from greater than or equal to about 2 micrometers to less than or equal to about 200 micrometers, and the first blocker composition and the second blocker composition each comprise:

greater than or equal to about 70 weight percent of an epoxy resin, less than or equal to about 10 weight percent of a curing agent, and greater than or equal to about 20 weight percent of an inorganic filler.

4. The method of claim 3, wherein the epoxy resin comprises a bisphenol A diglycidyl ether, the curing agent comprises a polyether amine-based compound, and the inorganic filler is selected from the group consisting of: silicon dioxide ($SiO_2$), aluminum oxide ($Al_2O_3$), zirconium oxide ($ZrO_2$), aluminum oxide hydroxide (γ-AlOOH), titanium dioxide ($TiO_2$), and combinations thereof.

5. The method of claim 1, wherein the polymer electrolyte is a polymer gel electrolyte; and the polymer gel electrolyte comprises:
greater than 0 weight percent to less than or equal to about 20 weight percent of a polymeric host,
greater than or equal to about 10 weight percent to less than or equal to about 20 weight percent of at least one lithium salt, and
greater than or equal to about 75 weight percent to less than or equal to about 90 weight percent of at least one solvent.

6. The method of claim 5, wherein the polymeric host is selected from the group consisting of: polyvinylidene fluoride (PVdF), polyvinylidene fluoride copolymers, polyacrylonitrile (PAN), polymethylmethacrylate (PMMA), oligomers, copolymers, and combinations thereof,
the at least one lithium salt is selected from the group consisting of: lithium bis(trifluoromethanesulfonyl)imide (LiTFSI), lithium bis(fluorosulfonyl)imide (LiFSI), hexafluoroarsenate, lithium hexafluoroarsenate ($LiAsF_6$), lithium hexafluorophosphate ($LiPF_6$), lithium bis(pentafluoroethanesulfonyl)imide (LiBETI), lithium bis(oxalato)borate (LiBOB), lithium difluoro(oxalato) borate (LiDFOB), lithium tetrafluoroborate ($LiBF_4$), lithium perchlorate ($LiClO_4$), lithium trifluoromethyl sulfonate (LiTFO), lithium-cyclo-difluoromethane-1,1-bis(sulfonyl)imide (LiDMSI), lithium bis(monofluoromalonato)borate (LiBFMB), lithium difluorophosphate ($LiPO_2F$), lithium fluoride (LiF), lithium difluoro(oxalato)borate (LiDFOB), and combinations thereof, and
the at least one solvent is selected from the group consisting of: ethylene carbonate (EC), diethylene carbonate (DEC), ethylmethylene carbonate (EMC), vinyl ethylene carbonate (VEC), dimethylene carbonate (DMC), vinylene carbonate (VC), and polystyrene (PS), and combinations thereof.

7. The method of claim 1, wherein the at least one bipolar electrode comprises a plurality of bipolar electrodes and the applying the first blocker composition precursor is to select edge regions of each of the plurality of bipolar electrodes.

8. The method of claim 1, wherein
the terminal negative electrode further comprises a negative electroactive material layer having a first height, and
the terminal positive electrode further comprises a positive electroactive material layer having a second height that is less than the first height.

9. A method of forming a battery via in situ polymerization, the method comprising:
applying a first epoxy-based blocker composition precursor to select edge regions of at least one bipolar electrode, a terminal negative electrode, and a terminal positive electrode, the select edge regions of the at least one bipolar electrode defined by a first current collector, the select edge regions of the terminal negative electrode defined by a second current collector, and the select edge regions of the terminal positive electrode defined by a third current collector;
assembling the at least one bipolar electrode, the terminal negative electrode, and the terminal positive electrode with at least two insulating interlayers disposed between electrodes of opposite polarities to form a stack defining a first side, a second side, a third side, and a fourth side, the first, second, and third current collectors each having a height that is greater than a height of the stack;
reacting the first epoxy-based blocker composition precursor to form a first epoxy-based blocker composition sealing only the first side, the second side, and the third side that together define a fillable interior region, the fourth side being unsealed by the first epoxy-based blocker composition;
injecting a precursor of a polymer electrolyte into the fillable interior region via the fourth side;
applying a second epoxy-based blocker composition precursor to a terminal region of the fourth side; and
concurrently reacting the precursor of the polymer electrolyte and the precursor of the second epoxy-based blocker composition to form a polymer electrolyte within the stack and a second epoxy-based blocker composition sealing the fourth side,
the polymer electrolyte comprising a polymeric host comprising a polyalkylene oxide, bis(trifluoromethanesulfonyl)imide (LiTFSI) and lithium tetrafluoroborate ($LiBF_4$), and a solvent mixture comprising ethylene carbonate (EC), diethylene carbonate (DEC), and ethylmethylene carbonate (EMC),
the first epoxy-based blocker composition and the second epoxy-based blocker composition defining a sealed pouch that comprises the stack comprising the polymer electrolyte.

10. The method of claim 9, wherein the polyalkylene oxide comprises polyethylene oxide (PEO).

11. The method of claim 9, wherein the polymer electrolyte comprises about 0.5 M of bis(trifluoromethanesulfonyl) imide (LiTFSI) and about 0.5 M of lithium tetrafluoroborate ($LiBF_4$).

12. The method of claim 9, wherein a volume ratio of ethylene carbonate (EC) to diethylene carbonate (DEC) to and ethylmethylene carbonate (EMC) in the solvent mixture is about 1:1:1.

13. The method of claim 12, wherein
the polymer electrolyte is a polymer gel electrolyte,
the polymer gel electrolyte comprises greater than or equal to about 82 weight % to less than or equal to about 90 weight % of the solvent mixture, and
the polymer gel electrolyte further comprises:
vinylene carbonate (VC) at about 1 weight % of a total weight of the polymer gel electrolyte,
vinyl ethylene carbonate (VEC) at about 0.5 weight % of the total weight of the polymer gel electrolyte, and
polystyrene at about 1.5 weight % of the total weight of the polymer gel electrolyte.

14. The method of claim 9, wherein the first blocker composition and the second blocker composition each have a thickness independently selected from greater than or equal to about 2 micrometers to less than or equal to about 200 micrometers.

15. The method of claim 9, wherein the first epoxy-based blocker composition and the second first epoxy-based blocker composition each comprises:
greater than or equal to about 70 weight percent of an epoxy resin,
less than or equal to about 10 weight percent of a curing agent, and
greater than or equal to about 20 weight percent of an inorganic filler.

16. The method of claim 15, wherein
the epoxy resin comprises a bisphenol A diglycidyl ether,
the curing agent comprises a polyether amine-based compound, and
the inorganic filler is selected from the group consisting of: silicon dioxide ($SiO_2$), aluminum oxide ($Al_2O_3$), zirconium oxide ($ZrO_2$), aluminum oxide hydroxide (γ-AlOOH), titanium dioxide ($TiO_2$), and combinations thereof.

17. The method of claim 9, wherein the polyalkylene oxide is greater than 0 weight percent to less than or equal to about 20 weight percent of a total weight of the polymer electrolyte, a total amount of the bis(trifluoromethanesulfonyl)imide (LiTFSI) and lithium tetrafluoroborate ($LiBF_4$) is greater than or equal to about 10 weight percent to less than or equal to about 20 weight percent of the polymer electrolyte, and greater than or equal to about 75 weight percent to less than or equal to about 90 weight percent of the solvent mixture.

18. A method of forming a battery via in situ polymerization, the method comprising:

applying a first blocker composition precursor to select edge regions of at least one bipolar electrode, a terminal negative electrode, and a terminal positive electrode;

assembling the at least one bipolar electrode, the terminal negative electrode, and the terminal positive electrode with at least two insulating interlayers disposed between electrodes of opposite polarities to form a stack defining a first side, a second side, a third side, and a fourth side;

reacting the first blocker composition precursor to form a first blocker composition sealing only the first side, the second side, and the third side that together define a fillable interior region, the fourth side being unsealed by the first blocker composition;

injecting a precursor of a polymer electrolyte into the fillable interior region via the fourth side, the polymer electrolyte being a polymer gel electrolyte comprising, at least one lithium salt, at least one solvent, and a polymeric host selected from the group consisting of: polyvinylidene fluoride (PVdF), polyvinylidene fluoride copolymers, polyacrylonitrile (PAN), polymethylmethacrylate (PMMA), oligomers, copolymers, and combinations thereof;

applying a second blocker composition precursor to a terminal region of the fourth side; and concurrently reacting the precursor of the polymer electrolyte and the precursor of the second blocker composition at greater than or equal to about 80° C. to less than or equal to about 90° C. to form a polymer electrolyte within the stack and a second blocker composition sealing the fourth side, the first blocker composition and the second blocker composition defining a sealed pouch that comprises the stack comprising the polymer electrolyte.

19. The method of claim 18, wherein the concurrently reacting the precursor of the polymer electrolyte and the precursor of the second blocker composition occurs for greater than or equal to about 30 minutes to less than or equal to about 3 hours.

20. The method of claim 18, wherein the select edge regions of the at least one bipolar electrode are defined by a first current collector, the select edge regions of the terminal negative electrode are defined by a second current collector, the select edge regions of the terminal positive electrode are defined by a third current collector, and the first, second, and third current collectors each having a height that is greater than a height of the stack.

* * * * *